Oct. 1, 1940.   W. L. KAUFFMAN, 2D   2,216,393
SAFETY MECHANISM FOR WRINGERS AND THE LIKE
Filed May 31, 1938   2 Sheets-Sheet 1
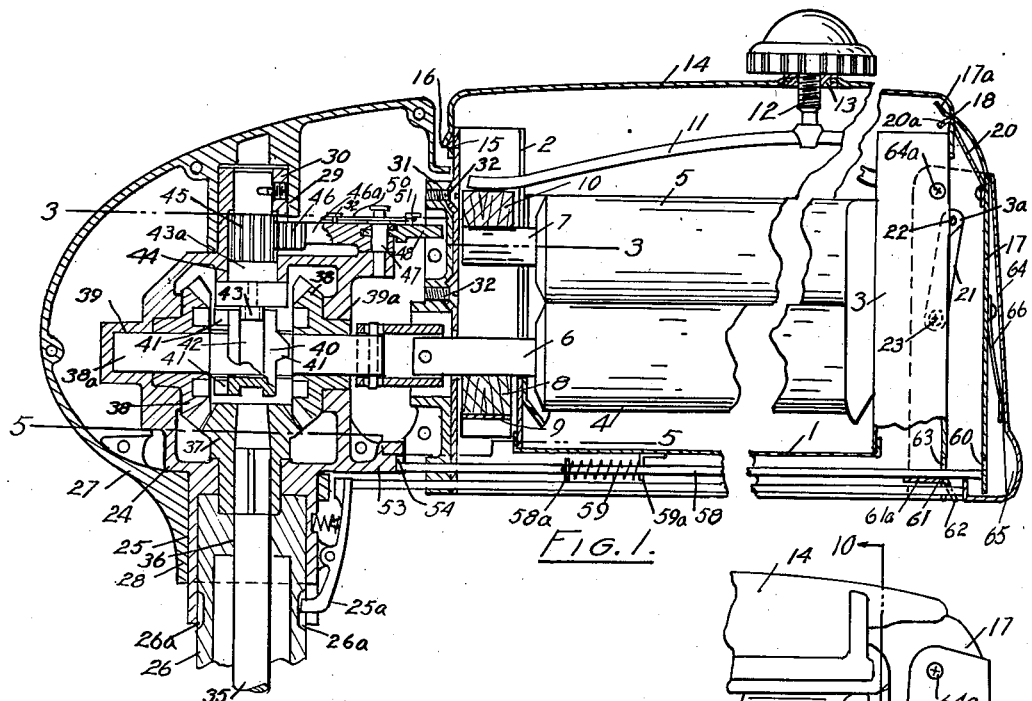
FIG. 1.
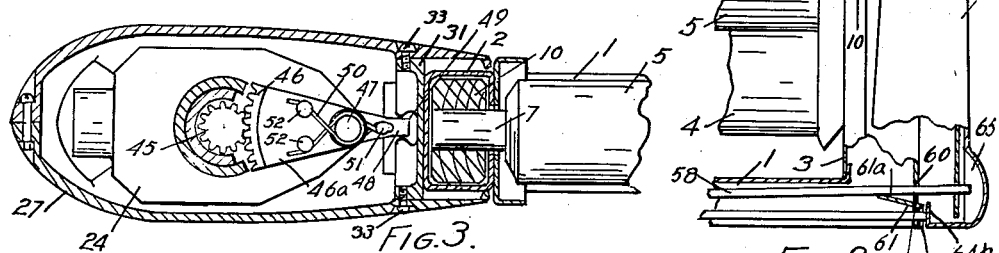
FIG. 3.
FIG. 2.
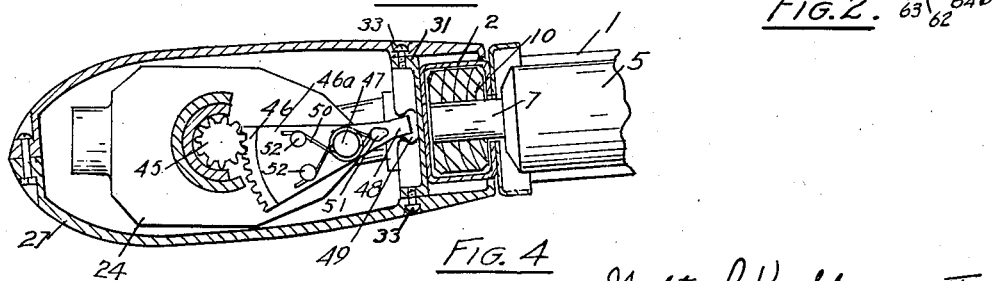
FIG. 4
Walter L. Kauffman II
INVENTOR.
BY
ATTORNEYS.

Oct. 1, 1940.  W. L. KAUFFMAN, 2D  2,216,393
SAFETY MECHANISM FOR WRINGERS AND THE LIKE
Filed May 31, 1938    2 Sheets-Sheet 2
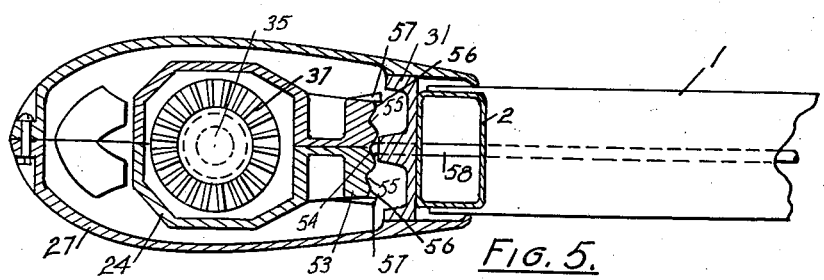
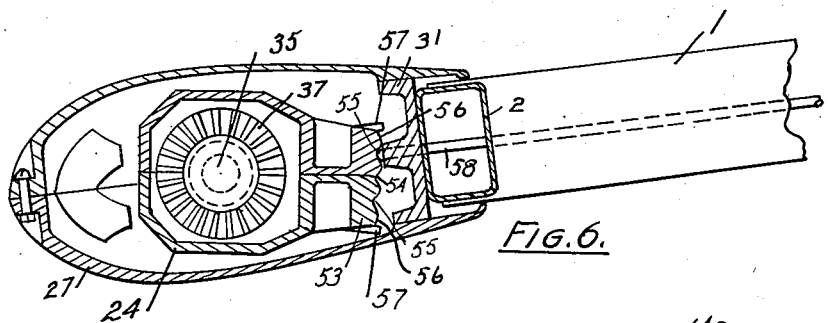
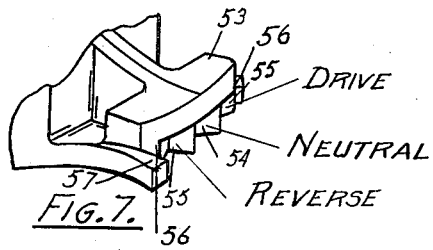
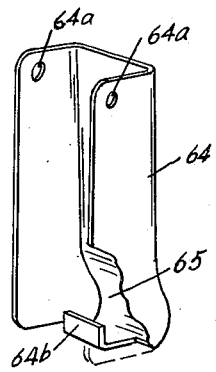
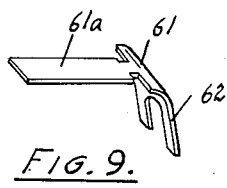
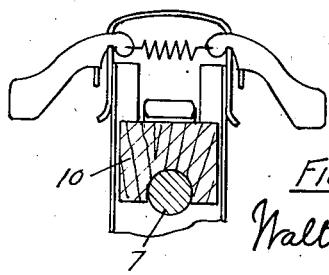
Walter L. Kauffman II
INVENTOR.
BY
ATTORNEYS.

Patented Oct. 1, 1940

2,216,393

UNITED STATES PATENT OFFICE 2,216,393

SAFETY MECHANISM FOR WRINGERS AND THE LIKE

Walter L. Kauffman, II, Erie, Pa., assignor to Lovell Manufacturing Company, Erie, Pa., a corporation of Pennsylvania Application May 31, 1938, Serial No. 210,866

10 Claims. (Cl. 68—253)

Power wringers involve some hazard in their operation in that, should the operator get caught between the rolls, injury results. Many efforts have been made to reduce the hazard, including devices for releasing the pressure on the rolls and devices for stopping the movement of the rolls. Many of such devices involve the operating of some trip mechanism by the operator to provide a safety action. It has been proposed that the safety action might be accomplished by movement of the wringer itself so that the instinctive pull of the operator who might be caught in the wringer, would effect the release. The present invention relates mainly to the type of release which is effected by a movement of the wringer and in the exemplification shown both types of releases are involved; namely, a release of the pressure and a release of the driving mechanism, both of which are accomplished directly and are responsive to the action or movement of the wringer. Features and details of the invention will appear from the specifications and claims.

A preferred embodiment of the invention is illustrated in the accompanying drawings as follows:

Fig. 1 shows a front elevation partly in section, of the wringer and its support.

Fig. 2 an enlarged view of the resetting end of the wringer.

Fig. 3 a section on the line 3—3 in Fig. 1 with the wringer in neutral position.

Fig. 4 a similar section with the wringer moved to operating position.

Fig. 5 a section on the line 5—5 in Fig. 1 with the wringer in neutral position.

Fig. 6 a similar section with the wringer in operating position.

Fig. 7 a perspective view of the release actuating cam.

Fig. 8 a perspective view of a pressure release negativing member.

Fig. 9 a perspective view of a trip mechanism for setting the parts against releasing, making the part for releasing ineffective.

Fig. 10 a section of the wringer on the line 10—10 in Fig. 2.

1 marks a base of the wringer frame; 2 a stile at the driving end of the wringer; 3 a stile at the opposite end of the wringer; 4 the lower wringer roll; 5 the upper wringer roll; 6 and 7 the shafts of said rolls respectively; 8 bearings for the shaft of the lower roll; 9 brackets in the stiles supporting the bearings 8; 10 bearings for the shaft of the upper roll, the bearings 10 being slidingly mounted in the stiles; 11 a pressure spring exerting pressure on the upper bearings and consequently upon the rolls; 12 an adjusting screw; 13 a nut in the frame in which the screw operates; 14 a top bar on the wringer, preferably of channel form with closed ends; 15 a shoulder struck up from the outer face of the stile; 16 a shoulder formed in the outer end of the top bar, these shoulders interlocking to detachably hold the top bar at the driving end of the wringer. These parts are, or may be, of known construction. A reset lever 17 is of channel form, the channel extending along the front and rear faces of the stile 3. The upper end of the reset lever projects at 17a through a slot 18 in the end of the top bar. A plate 20 is secured to the inside of the setting lever and has a hooked end 20a which is arranged in the opening 18, this hooked end forming a hinge for the setting lever. Links 21, one at each side of the stile, are pivoted at 22 on ears 3a on the stile, and links 21 are also pivoted at 23 on the side webs of the resetting lever 17. The links and the resetting lever form a toggle which, as the resetting lever is swung up, releases the top bar, and as the resetting lever is swung down, throws the top bar down, resetting the pressure on the spring. As shown, the line of the pivots 22 and 23 is such that when the resetting lever is in its lower position, it is stable because the links 21 are slightly beyond center.

A gear 24 has the cylindrical projection 25 which is swiveled on a supporting post 26. A pawl 25a is mounted on the projection 25 and extends into slots 26a to lock the wringer in different settings. A gear case frame 27 is provided with a swivel projection 28 which is rotatingly mounted on the outside of the projection 25. Ordinarily this case is made in halves secured together. The upper end of the case has a socket 29 which is swiveled on a projection 30 in the upper part of the gear frame. A hanger plate 31 is secured to the stile 2 by screws 32 and the case is secured to the hanger plate 31 by screws 33. By this construction the wringer frame and the case are rigidly secured together and the wringer frame can swing with the case on the swivel connection between the projection 28 and the projection 25. A drive shaft 35 extends upwardly through a post 26 and is journaled in a bearing 36 in the gear frame. A gear 37 is fixed on the upper end of the shaft 35 and meshes with the gears 38, the gears 38 being fixed on a shaft 38a, one end of the shaft being journaled in the frame at 39 and the hub of the inner gear 38 being journaled in the bearing 39a. A clutch collar 40 is splined on the shaft 38a and has the usual clutch jaws 41 and annular groove 42. A crank 43 is mounted on shaft 43a and operates in the groove 42, to shift the reversing block 40. The shaft 43a is carried in bearing 44 in the frame.

A gear 45 is fixed on the shaft and meshes with a gear segment 46 carried by a rocker plate 46a. The rocker plate is mounted on a shaft 47 and the shaft 47 is fixed in the frame. An extension 48 projects to the rear of the plate 46a into a groove 49 in the hanger plate 31. The end of the projection is cylindrical so that it can swing in the groove in order to rock the plate 46a when the wringer is moved on the swivel connection between the projection 28 and the projection 25, the post 47 being off center sufficiently to rock the plate with such movement.

The rocking of the plate acting through the gear segment 46 rotates the gear 45 and this throws the crank 43 so as to actuate the clutch block 40 moving it in one direction when the wringer is moved toward the rear end, connecting it for driving in the reverse direction when the wringer is pulled forward. Springs 50 are coiled on the post 47, the rear ends of the spring engaging a pin 51 in the extension 48. The opposite ends of the springs engage pins 52 on the plate 46a. These springs are tensioned so as to be in balance when the wringer is in neutral or central position. The springs therefore tend to center the wringer.

The pressure release is accomplished by throwing the resetting lever so as to carry the toggle past center. This releases the top bar and under the pressure spring the toggle links are opened and pressure release on the roll accomplished. The mechanism moving the setting lever for this purpose is as follows: A cam plate 53 is fixed with the frame. It has a series of notches, the notch 54 being arranged at the center, which may be called the neutral notch, notches 55 at each side of the notch 54, which may be called the operating notches, raised portions 56 at each side of the notch 55 which actuate the release mechanism, and stops 57 at the ends of the raised portions 56. A rod 58 is provided with a collar 58a against which a spring 59 operates, the spring being based on a plate 59a secured to the base of the wringer. The end of the rod 58 is adapted to enter the notches 54 and 55 and to be actuated endwise by the camming action of the slopes of the notches. The outer plate of the lever 17 is perforated at 60. This perforation is just above the rod 58 when the rod is in normal position. A trip plate 61 has an end 61a which extends through a slot 63 in the side stile. The trip plate has a downwardly extending arm 62 which is in the path of an inturned end 64b of a negativing plate 64. The plate 64 has a cavity 65 formed in its face which gives clearance for the rod 58 when the rod 58 extends through the perforation 60. The plate 64 is of channel form, the sides extending around the sides of the release lever 17 and it is pivoted on the sides of the release lever at 64a. A spring 66 yieldingly holds the negativing plate outwardly from the lever 17. When it is desired to reset the wringer, it may be drawn to neutral and ordinarily would be in neutral from the previous release. The resetting lever 17 is forced downwardly putting a pressure on the spring. As it approaches its final position, the inturned end 64b engages the trip plate and raises the rod 58 upwardly into register with the openings 60. The operator holds the negativing plate inwardly and moves the wringer to the set position, bringing the end of the rod into a notch 55. The negativing plate is then released. It swings back, allowing the rod 58 to drop down out of register with the opening 60. The rod, it will be understood, is forced by the spring 59 into the notch 55 so that the outer end of the rod will just clear the inner face of the lever 17. The force of the spring 59 is sufficient to center the wringer and to hold the wringer under ordinary operation.

With the wringer so set, the operator proceeds with the work. Should the operator be caught, ordinarily the operator would instinctively pull the wringer toward her. This swings the wringer and through the camming action of the slope of the notch 55, the rod 58 is forced outwardly and this forces the lever 17 past the toggle center and the pressure is released. Should the operator under panic conditions push the wringer from her, the outer slope of the notch 55 would likewise move the rod endwise and effect a release. The stops 57 prevent a swinging of the wringer beyond the notch 55. At the same time the clutch block is swung through the gear mechanism to stop the action of the rolls.

It will be observed that in resetting the wringer to operating position, the operator avoids a release action on the rod as the rod passes from the notch 54 to the notch 55 by holding the negativing plate in its inner position, thus holding the rod 58 in register with the opening 60.

What I claim as new is:

1. A wringer having a wringer frame, rolls mounted in the frame, a pressure means exerting pressure on the rolls, a mounting for the wringer frame on which the frame is movable, a driving mechanism for the rolls, a resetting device acting on the pressure means to reset the pressure on the rolls, and releasing means responsive to movement of the wringer frame actuating the resetting device to release the pressure means; the combination with the releasing means of devices making the releasing means inactive.

2. A wringer having a wringer frame, rolls mounted in the frame, a pressure means exerting pressure on the rolls, a mounting for the wringer frame on which the frame is movable, a driving mechanism for the rolls, a resetting device acting on the pressure means to reset the pressure on the rolls, and releasing means responsive to movement of the wringer frame actuating the resetting device to release the pressure means; the combination with the releasing means of devices making the releasing means inactive as the resetting device is actuated.

3. A wringer having a wringer frame, rolls mounted in the frame, a pressure means exerting pressure on the rolls, a mounting for the wringer frame on which the frame is movable, a driving mechanism for the rolls, a resetting device acting on the pressure means to reset the pressure on the rolls, and releasing means responsive to movement of the wringer frame actuating the resetting device to release the pressure means; the combination with the releasing means of devices making the releasing means inactive as the wringer frame is moved on its mounting.

4. A wringer having a wringer frame, rolls mounted in the frame, a pressure means exerting pressure on the rolls, a mounting for the wringer frame on which the frame is movable, a driving mechanism for the rolls, a resetting device acting on the pressure means to reset the pressure on the rolls, and releasing means responsive to movement of the wringer frame actuating the resetting device to release the pressure means; the combination with the releasing means of devices making the releasing means inactive, said devices being actuated with the resetting device.

5. In a wringer having a wringer frame, rolls mounted in the frame, pressure means exerting pressure on the rolls, a mounting for the wringer frame on which the wringer frame is movable, a driving mechanism for the rolls, said driving mechanism being arranged at one end of the wringer, and a release device acting on the pressure means to release pressure on the rolls, the release device being arranged on the opposite end of the wringer from the driving mechanism; the combination with the release device of a rod actuating the release device extending from the release device to the driving end of the wringer, and means comprising a series of fixedly mounted cam-faced notches acting on the rod to actuate the rod to trip the release device with a movement of the wringer frame on the mounting.

6. In a wringer having a wringer frame, rolls mounted in the frame, pressure means exerting pressure on the rolls, a mounting for the wringer frame on which the wringer frame is movable, a driving mechanism for the rolls, said driving mechanism being arranged at one end of the wringer, and a release device acting on the pressure means to release pressure on the rolls, the release device being arranged on the opposite end of the wringer from the driving mechanism; the combination with the release device of a rod actuating the release device extending from the release device to the driving end of the wringer, means comprising a series of fixedly mounted cam-faced notches acting on the rod to actuate the rod to trip the release device with a movement of the wringer frame on the mounting, and a spring pressing the rod into the notches.

7. In a wringer having a wringer frame, rolls mounted in the frame, pressure means exerting pressure on the rolls, a mounting for the wringer frame on which the wringer frame is movable, a driving mechanism for the rolls, said driving mechanism being arranged at one end of the wringer, and a release device acting on the pressure means to release pressure on the rolls, the release device being arranged on the opposite end of the wringer from the driving mechanism; the combination with the release device of a movable rod actuating the release device extending from the release device to the driving end of the wringer, means at the driving end of the wringer actuating the rod with a movement of the wringer frame on its mounting, and means making the action of the rod ineffective in securing a release.

8. In a wringer having a wringer frame, rolls mounted in the frame, pressure means exerting pressure on the rolls, a mounting for the wringer frame on which the frame is movable, and a driving mechanism for the rolls, said driving mechanism being arranged at one end of the wringer frame; the combination with the pressure device of a resetting device acting on the pressure means to reset pressure on the rolls, said resetting device being arranged at the opposite end of the wringer from the driving mechanism and comprising toggle links with an extended lever, a movable rod adapted to engage said lever and extending from the lever to the driving end of the wringer frame, and means at the driving end of the wringer frame acting on the rod to cause an endwise movement of the rod with a movement of the wringer frame on its mounting and with the endwise movement of the rod a movement of the resetting lever to release the resetting lever and the pressure on the rolls.

9. In a wringer having a wringer frame, rolls mounted in the frame, a pressure means for the rolls, a resetting device for pressing the pressure means into pressure exerting position, a driving mechanism for the rolls, a mounting for the wringer frame on which the wringer frame is movable, and releasing means for the driving mechanism; the combination with the releasing means of devices responsive to a movement of the wringer frame actuating the resetting device to release the pressure on the rolls and the releasing means to release the driving mechanism.

10. In a wringer having a wringer frame, rolls mounted in the frame, a mounting for the wringer frame on which the wringer is movable, a driving mechanism for the rolls comprising a gear mechanism, means setting and releasing said gears comprising a crank, and a gear fixed with the crank; the combination with the gear mechanism and movable wringer frame of a gear segment operating the gear, a gear frame fixed with the mounting carrying the gears, and means operative with a movement of the wringer frame swinging the segment to reset and release the driving mechanism.

WALTER L. KAUFFMAN, II.